United States Patent
Endoh et al.

(10) Patent No.: US 12,507,922 B2
(45) Date of Patent: Dec. 30, 2025

(54) PROTECTIVE FILM MATERIAL FOR BIOSENSOR PROBE

(71) Applicant: PHC Holdings Corporation, Tokyo (JP)

(72) Inventors: Takashi Endoh, Ehime (JP); Junko Ikeda, Ehime (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 859 days.

(21) Appl. No.: 16/979,955

(22) PCT Filed: Jan. 28, 2019

(86) PCT No.: PCT/JP2019/002802
§ 371 (c)(1),
(2) Date: Sep. 11, 2020

(87) PCT Pub. No.: WO2019/176339
PCT Pub. Date: Sep. 19, 2019

(65) Prior Publication Data
US 2021/0000393 A1    Jan. 7, 2021

(30) Foreign Application Priority Data

Mar. 13, 2018 (JP) .................................. 2018-045764

(51) Int. Cl.
*A61B 5/1486* (2006.01)
*A61B 5/145* (2006.01)
(Continued)

(52) U.S. Cl.
CPC ........ *A61B 5/1486* (2013.01); *A61B 5/14532* (2013.01); *C08L 53/00* (2013.01); *G01N 27/3272* (2013.01); *G01N 27/3277* (2013.01)

(58) Field of Classification Search
CPC ... A61B 5/1486; A61B 5/14532; C08L 53/00; G01N 27/3272; G01N 27/3277
See application file for complete search history.

(56) References Cited

U.S. PATENT DOCUMENTS

| 7,226,978 B2 | 6/2007 | Tapsak et al. |
| 8,527,024 B2 | 9/2013 | Staib et al. |
| (Continued) | | |

FOREIGN PATENT DOCUMENTS

| CN | 104987476 | 10/2015 |
| JP | 2005-531755 | 10/2005 |
| (Continued) | | |

OTHER PUBLICATIONS

International Preliminary Report on Patentability issued Sep. 15, 2020, in International (PCT) Application No. PCT/JP2019/002802.

(Continued)

*Primary Examiner* — Alex M Valvis
*Assistant Examiner* — Grace L Rozanski
(74) *Attorney, Agent, or Firm* — Wenderoth, Lind & Ponack, L.L.P.

(57) ABSTRACT

The present disclosure provides, as a film structure useful for a probe of a biosensor, a film structure comprising a detection layer including an analyte-responsive enzyme; and a protection film formed on the detection layer, in which the protection film includes a copolymer mixture including poly(styrene-ran-4-vinylpyridine-ran-propyleneglycol methacrylate); and poly(4-vinylpyridine)-block-poly($C_{1-15}$ alkyl methacrylate), or poly(4-vinylpyridine-ran-2-hydroxyethyl methacrylate).

15 Claims, 16 Drawing Sheets

(51) Int. Cl.
*C08L 53/00* (2006.01)
*G01N 27/327* (2006.01)

(56) References Cited

U.S. PATENT DOCUMENTS

| | | |
|---|---|---|
| 8,808,515 B2 | 8/2014 | Feldman et al. |
| 10,190,100 B1* | 1/2019 | Liu .................. C12Q 1/006 |
| 10,422,765 B2 | 9/2019 | Staib et al. |
| 2003/0042137 A1* | 3/2003 | Mao .................. C12Q 1/002 |
| | | 204/415 |
| 2003/0217966 A1 | 11/2003 | Tapsak et al. |
| 2008/0044721 A1* | 2/2008 | Heller .................. C12Q 1/32 |
| | | 429/449 |
| 2008/0179187 A1 | 7/2008 | Ouyang et al. |
| 2009/0069481 A1* | 3/2009 | Zhang .................. G01N 21/658 |
| | | 524/413 |
| 2009/0099433 A1 | 4/2009 | Staib et al. |
| 2010/0191083 A1* | 7/2010 | Parker .................. G01N 33/5438 |
| | | 600/347 |
| 2011/0002993 A1* | 1/2011 | Bodis .................. A61K 9/1694 |
| | | 514/173 |
| 2011/0257289 A1* | 10/2011 | Biggs .................. C09D 5/1668 |
| | | 524/556 |
| 2014/0018653 A1 | 1/2014 | Staib et al. |
| 2016/0139588 A1* | 5/2016 | Huang .................. G05B 19/19 |
| | | 700/275 |
| 2017/0011930 A1 | 1/2017 | Jeong et al. |
| 2017/0125247 A1 | 5/2017 | Kim et al. |
| 2018/0271413 A1* | 9/2018 | Chaum .................. A61M 5/14216 |
| 2019/0133638 A1 | 5/2019 | Ii et al. |

FOREIGN PATENT DOCUMENTS

| | | |
|---|---|---|
| JP | 2010-517054 | 5/2010 |
| JP | 2015-515305 | 5/2015 |
| WO | 2007/147475 | 12/2007 |
| WO | 2015/170030 | 11/2015 |
| WO | 2017/187943 | 11/2017 |

OTHER PUBLICATIONS

International Search Report (ISR) issued Mar. 19, 2019 in corresponding International (PCT) Application No. PCT/JP2019/002802.

\* cited by examiner

[Fig. 1]
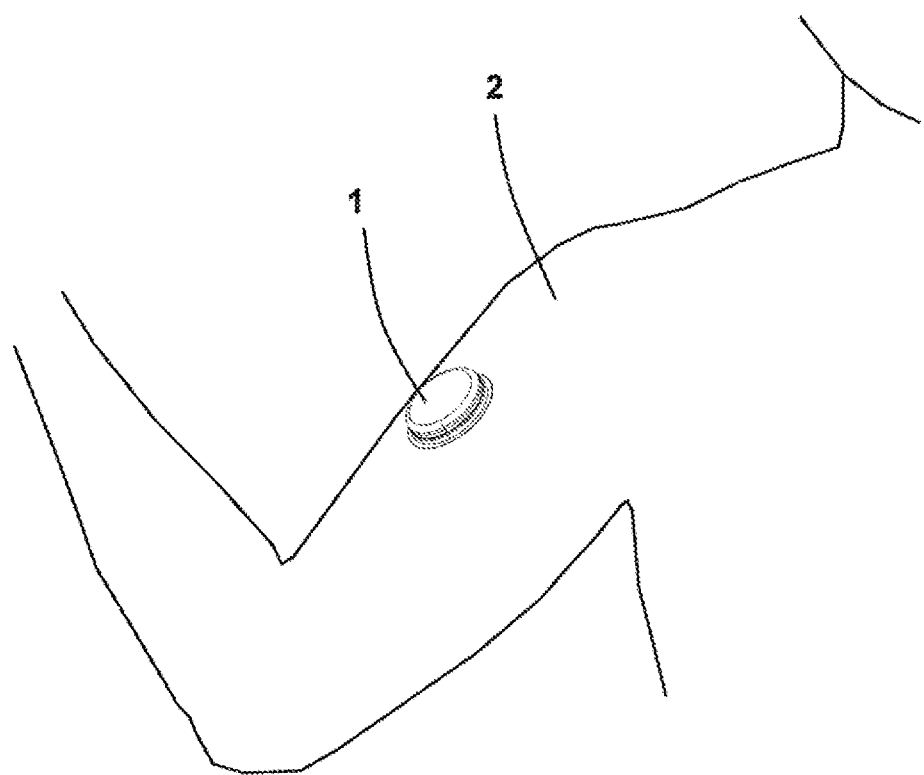

[Fig. 2]
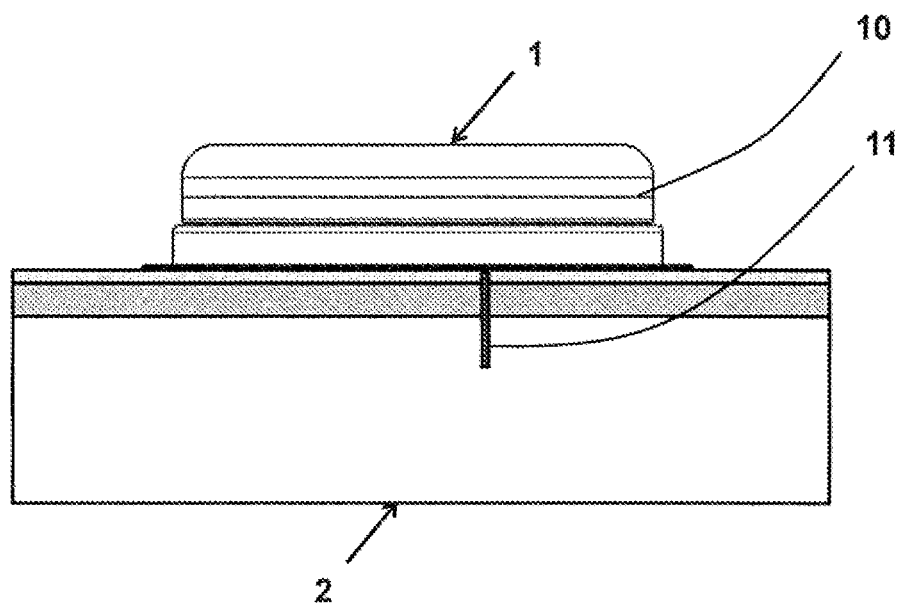

[Fig. 3]
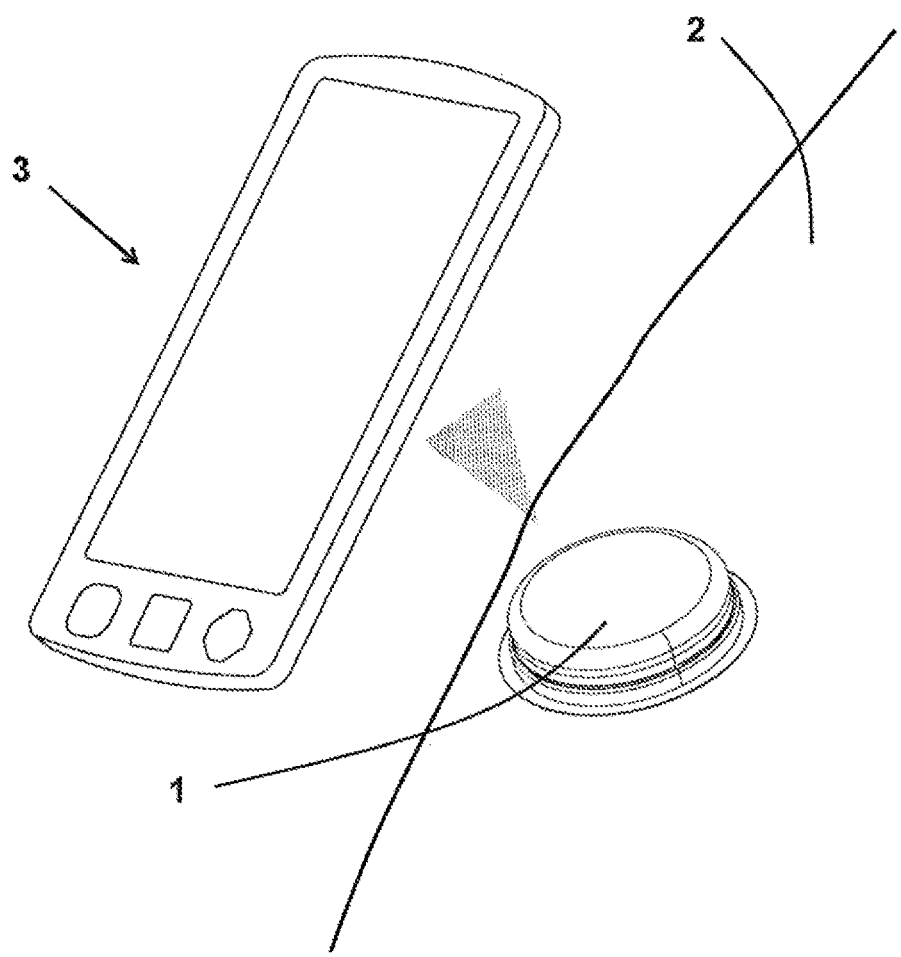

[Fig. 4]
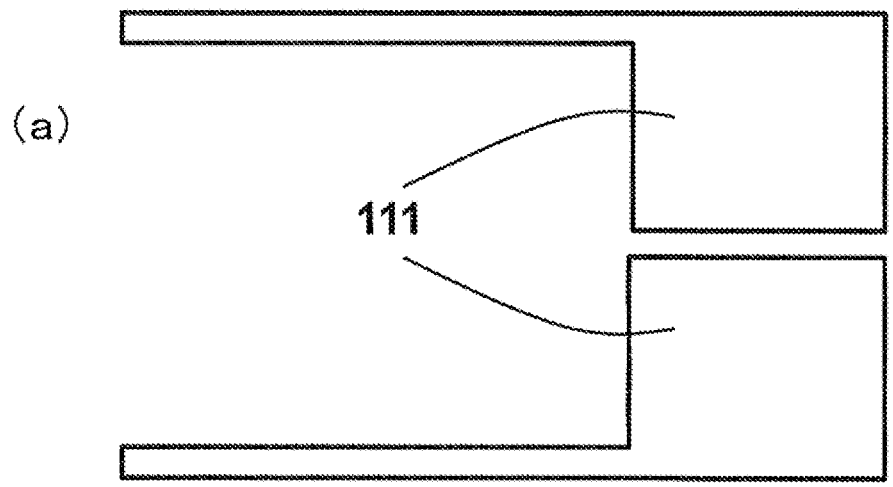
(a)
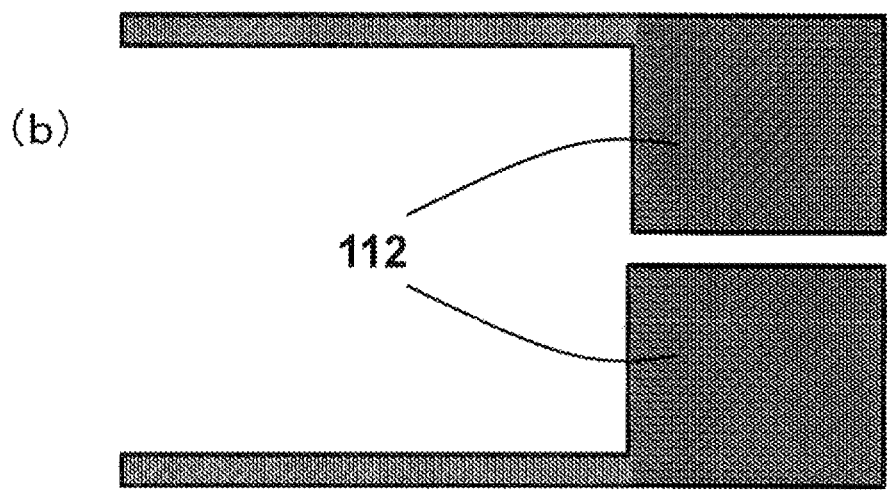
(b)

[Fig. 5]
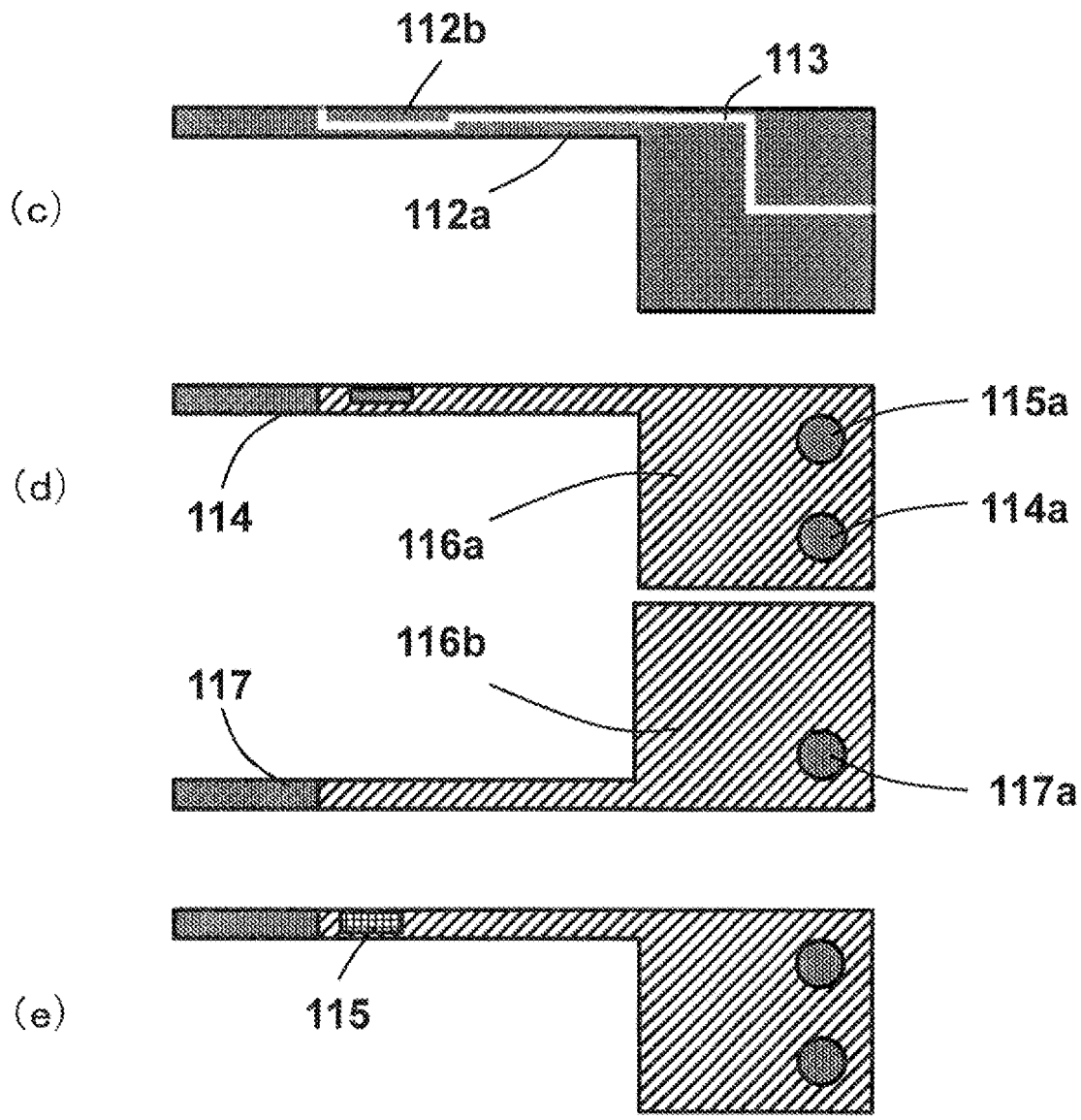

[Fig. 6]
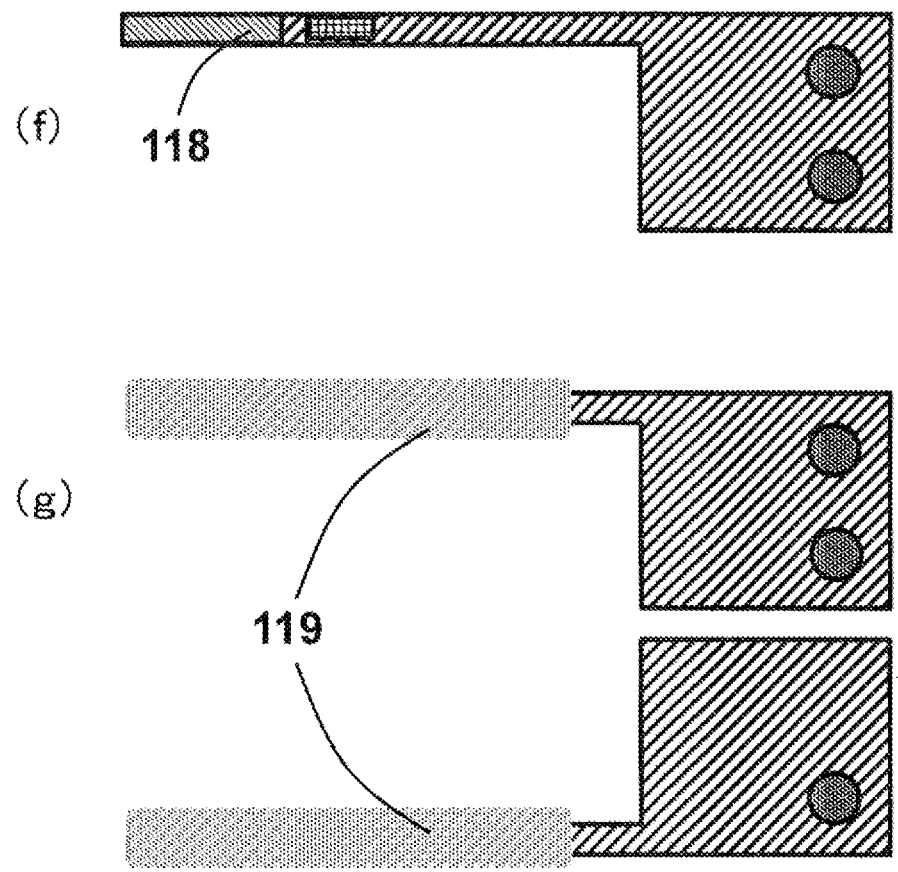

[Fig. 7]
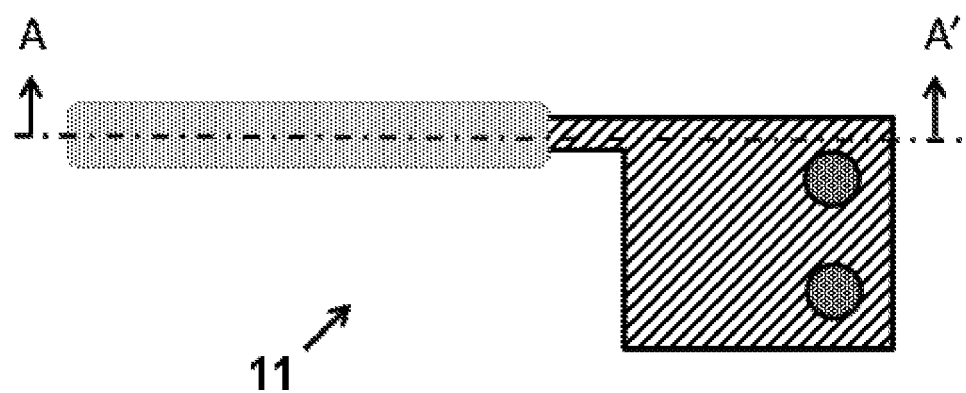

[Fig. 8]
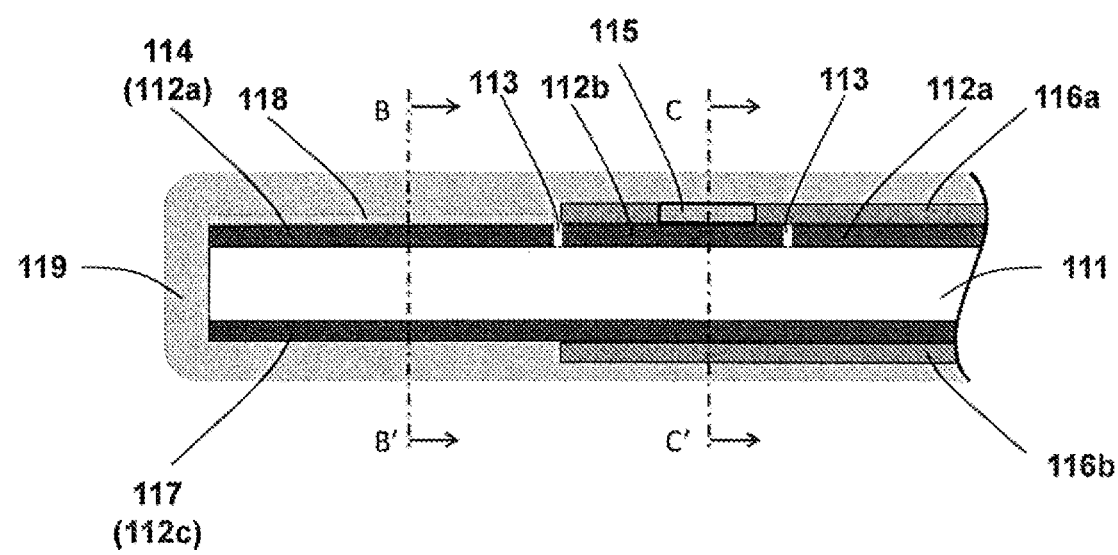

[Fig. 9]
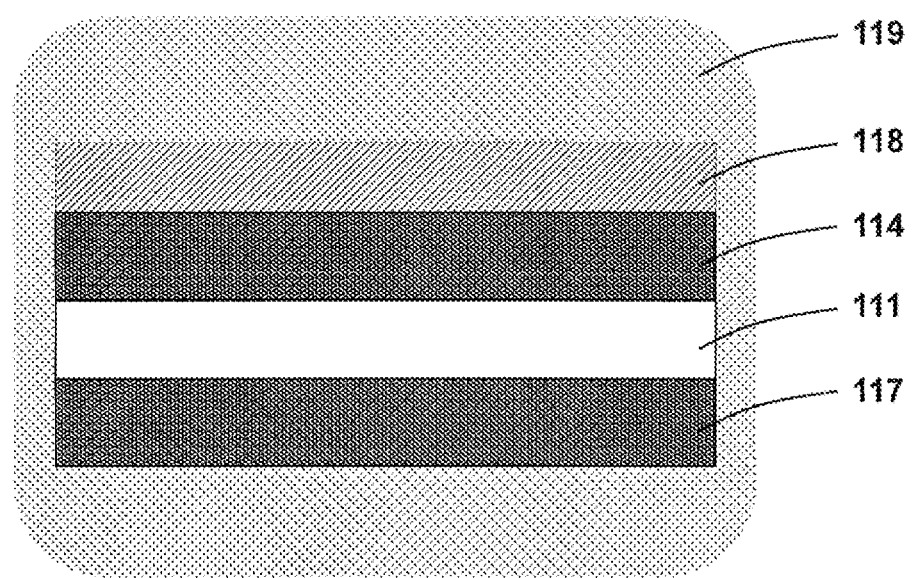

[Fig. 10]
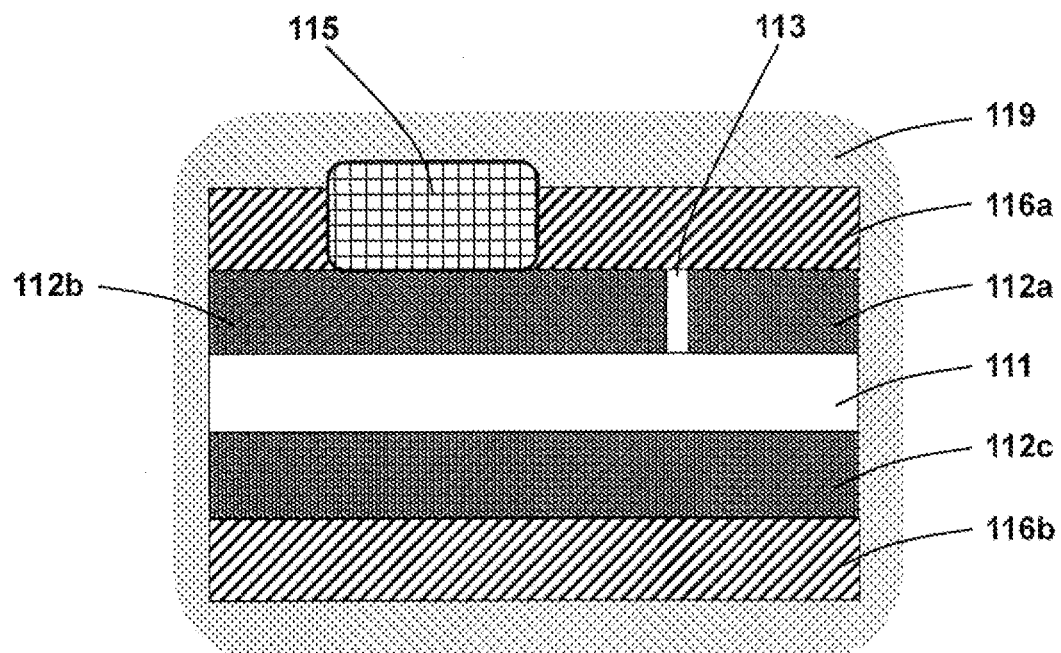

[Fig. 11]
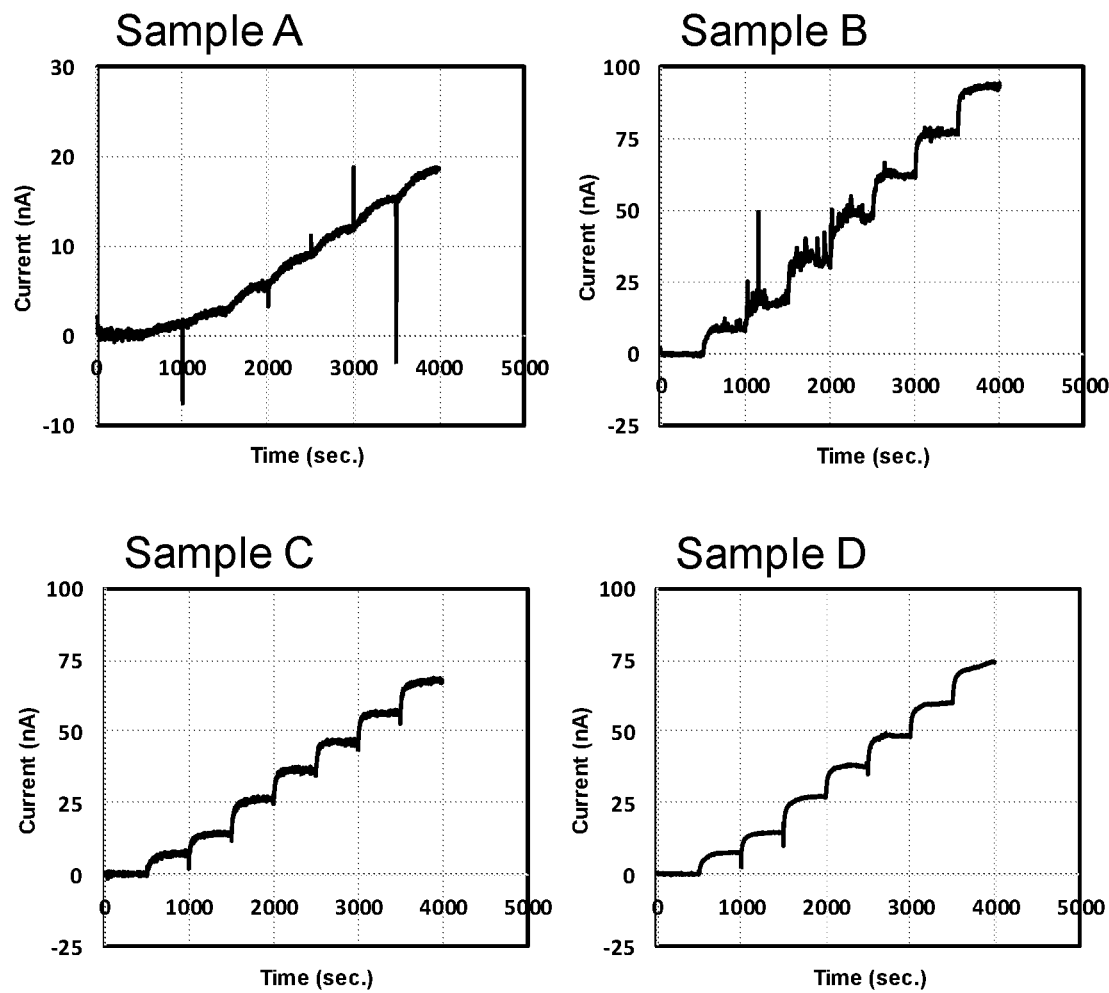

[Fig. 12]
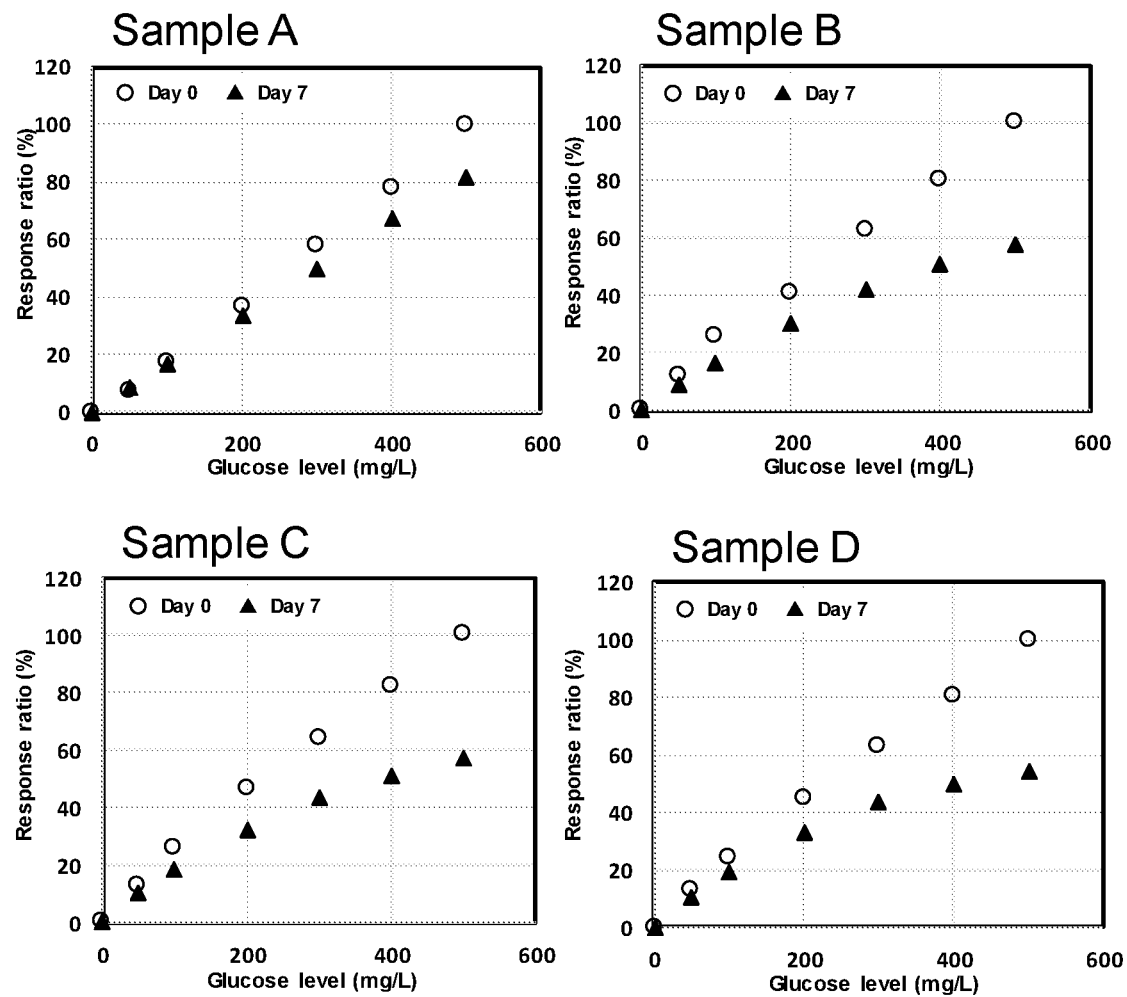

[Fig. 13]
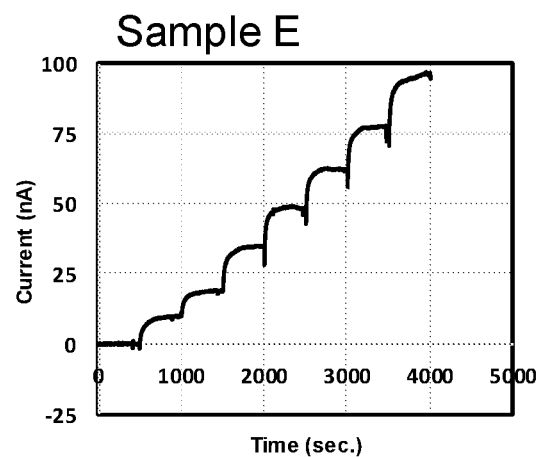
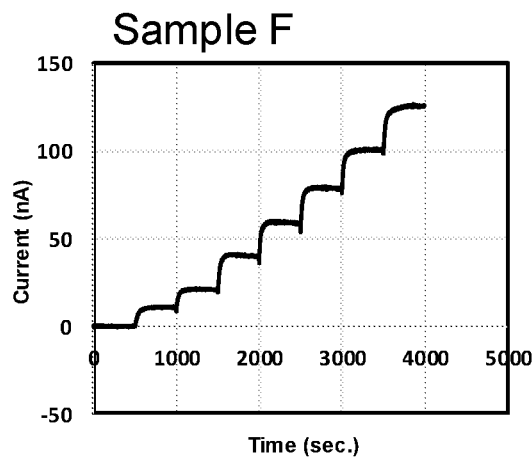

[Fig. 14]
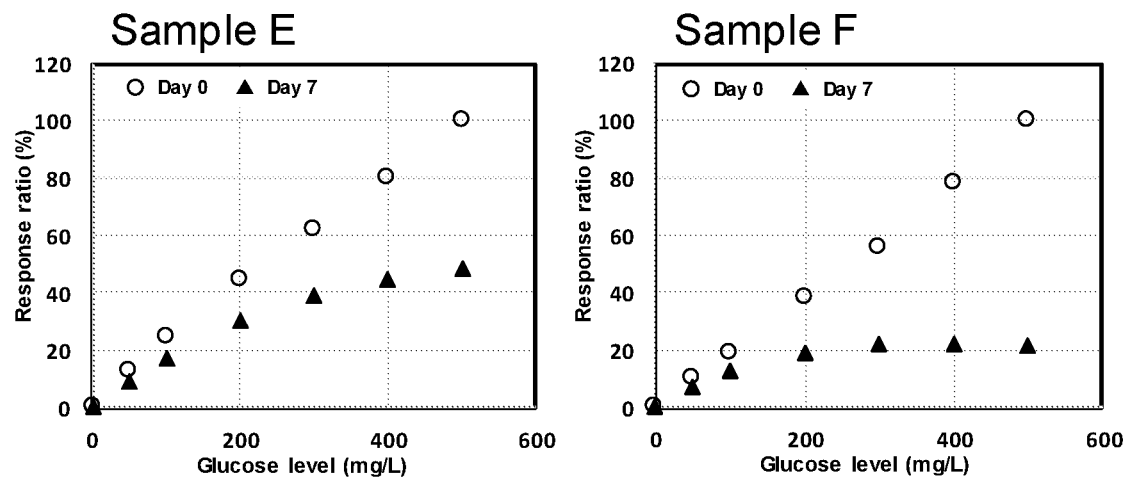

[Fig. 15]
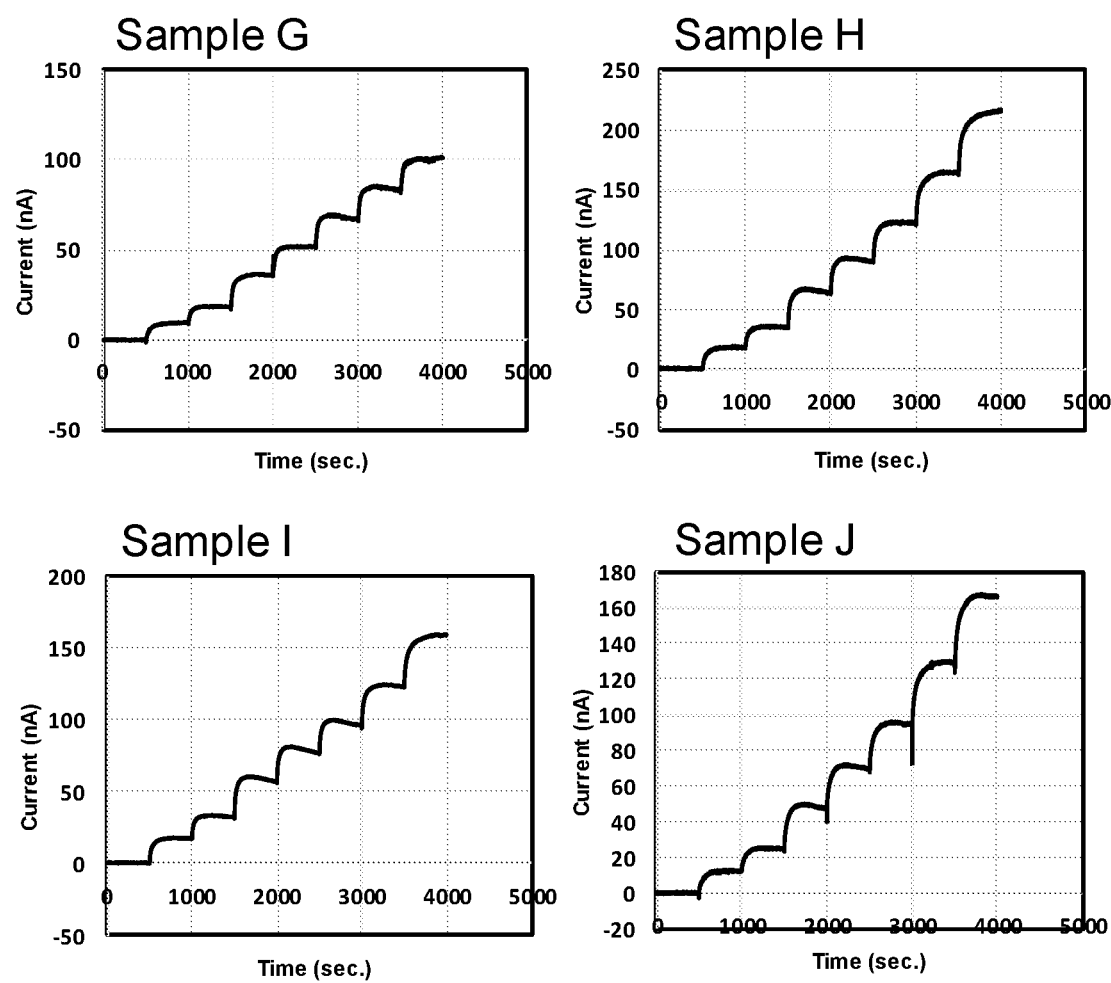

[Fig. 16]
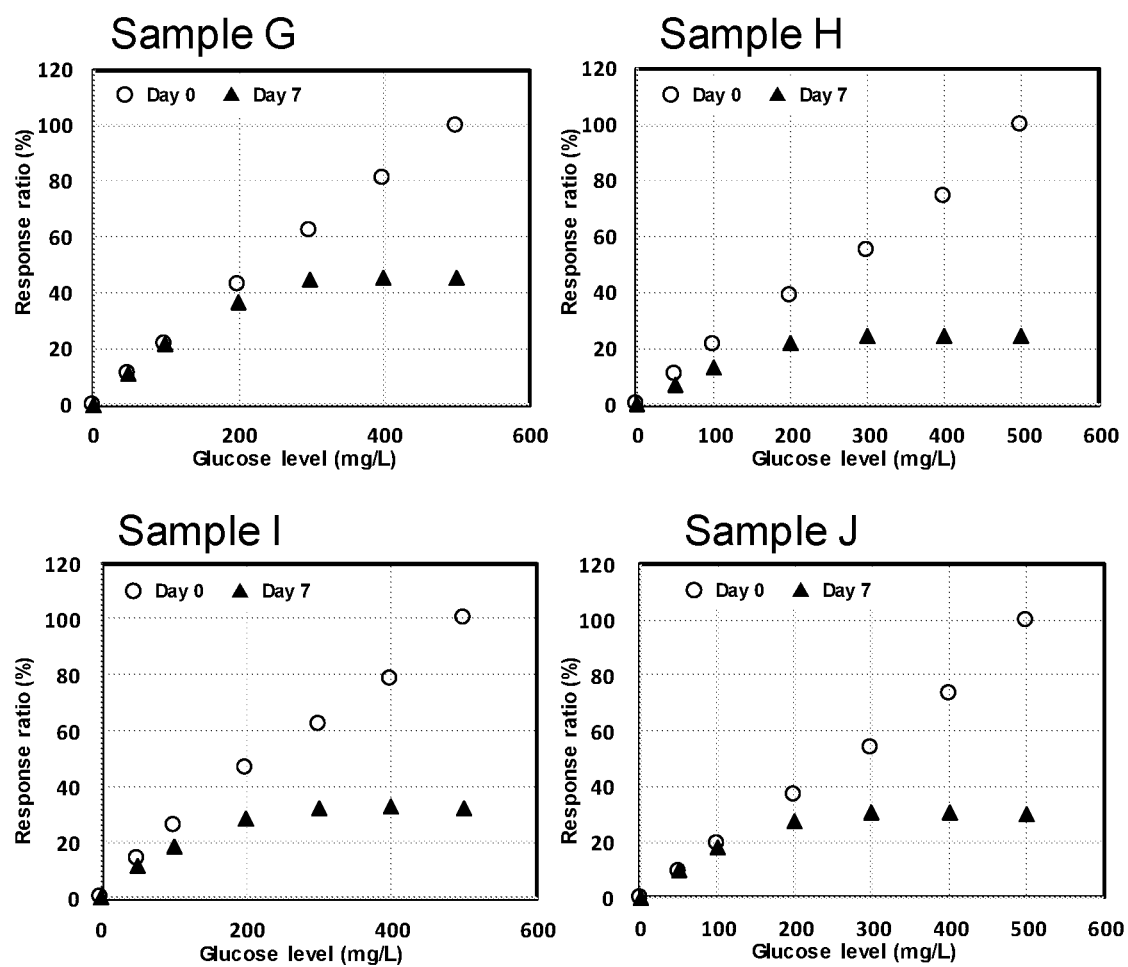

PROTECTIVE FILM MATERIAL FOR BIOSENSOR PROBE

TECHNICAL FIELD

The present disclosure relates to a film material for protecting a probe constituting a biosensor. More specifically, provided is a polymer material for a protection film that can prevent an enzyme or a mediator constituting a biosensor probe inserted in the body from flowing out.

BACKGROUND ART

A biosensor is a system for measuring a substance by utilizing or imitating a molecular recognition ability of a living body, a measurement device that, using among combinations of, for example, an enzyme and a substrate, an antigen and an antibody, a hormone and a receptor, one as an analyte (target substance to be measured), and the other one as a receptor, converts a chemical change generated by a molecular recognition reaction between the analyte and the receptor into electric signals with a transducer, and measures an amount of the analyte according to the intensity of the obtained electric signals.

Besides the above-described living molecules, living molecules used for a biosensor include genes, sugar chains, lipids, peptides, cells, and tissues. Among these, development of a biosensor using an enzyme is mostly advanced, and a representative example thereof is a glucose sensor using glucose oxidase (GOx).

In an electrochemical glucose sensor used for self monitoring of blood glucose, generally, a cover is disposed on an insulating substrate in which an electrode is formed on the surface, with a spacer interposed between the cover and the insulating substrate. A reagent containing an analyte-responsive enzyme, a redox mediator (electron carrier), or the like is disposed on the electrode, and this part serves as an analysis part. The analysis part communicates with one end of a flow path for introducing blood, and the other end of the flow path, which becomes a blood supply port, opens toward the outside. The measurement of the blood glucose level using such a sensor is, for example, carried out as follows. That is, the sensor is first set to a dedicated measurement device (meter). Then, a fingertip or the like is cut with a lancet to cause bleeding, and blood is brought into contact with the blood supply port of the sensor. Blood is absorbed in the flow path of the sensor by capillary phenomenon, introduced into the analysis part through the flow path, and brought into contact with the reagent. Then, an analyte-responsive enzyme E (for example, GOx, and GDH) specifically reacts with glucose in the blood to oxidize glucose. A redox mediator M receives electrons generated due to oxidization. The redox mediator M, which has been reduced by accepting electrons, is electrochemically oxidized in the electrode. The glucose concentration in the blood, that is, the blood glucose level is simply detected from, for example, a magnitude of the current value, or a quantity of electric charge obtained by oxidization of a reduced form of the redox mediator M.

Such an electrochemical blood glucose sensor plays an important role in blood glucose level management for diabetes treatment and allows appropriate insulin administration as well as dietary restriction for diabetic patients based on the blood glucose level. However, such an electrochemical blood glucose sensor requires several times of blood glucose level measurements a day, and patients are forced to endure pain due to blood collection every time. Thus, it has been difficult for the patients to maintain the quality of life (QOL).

An embedded-type amperometric glucose sensor has already been developed. A main body 10 of such an embedded-type amperometric glucose sensor 1 is attached to a living body 2, a probe part 11 is then inserted in the living body, and the blood glucose level is continuously measured (FIGS. 1 and 2). This allows measurement of blood glucose level for a long time without collecting blood every time.

The Ministry of Health, Labor and Welfare issued "telemedicine notification in 1997 (notification No. 1075, dated on Dec. 24, 1997, issued from the director general of the Health Policy Bureau, Ministry of Health, Labor and Welfare)" and indicated the basic concept of telemedicine as well as points of attention regarding Article 20 of the Medical Practitioners' Act, or the like. Thereafter, the Ministry of Health, Labor and Welfare made an announcement regarding medical examination using information communication devices, that is, telemedicine, to the prefectural governors on Aug. 10, 2015, considering the states of development and spread of the information communication devices. The ban on telemedicine was practically lifted by the notification in 2015 and, in 2016, telemedicine tools, which perform wireless data communication with a biosensor 1 using an information communication device 3 (smartphone) and a dedicated application, have been distributed over the world (FIG. 3). A notification (No. 0714-4, issued from the Health Policy Bureau) was further issued on Jul. 14, 2017 in order to announce and clarify the handling of telemedicine once again. According to the notification in 2015, in telemedicine, telemedicine that combines information communication devices, such as video telephone, E-mail, and social networking service does not immediately conflict with Article 20 of the Medical Practitioners' Act, or the like, as long as parties who are involved in the telemedicine can be identified to be a doctor and a patient himself/herself, in the case where the doctor can obtain useful information on the mental and physical conditions of the patient in a level that can be substituted for the face to face medical examination. The notification in 2017 will permit further development in telemedicine utilizing information communication devices. Accordingly, it is expected that the demand for the embedded-type sensor further increases.

Patent Literature 1 discloses an electrochemical sensor controlling device using a wireless transmitter, the device being attached to the patient and inserted in the skin. Patent Literature 1 also describes a technique of transmitting data on an amount of analyte collected to a display unit using a wireless transmitter. Patent Literature 1 also discloses a film including a heterocyclic nitrogen group such as vinylpyridine, which is attached to such an electrochemical sensor. These films restrict diffusion of the analyte in a working electrode of the electrochemical sensor. In a glucose sensor having no film, the amount of glucose flowing into a detection layer is linearly increased along with the glucose concentration. Output signals measured are linearly proportional to the flow amount of glucose until all the glucose that reaches the detection layer is consumed. However, in a case where consumption of glucose is restricted in the detection layer, measured signals are not linearly proportional to the flow amount or concentration of glucose, and saturation occurs. Thus, Patent Literature 1 employs a technique of preventing saturation in the sensor, by forming a diffusion restricting film including a heterocyclic nitrogen group such as polyvinylpyridine on the detection layer to decrease the amount of glucose flowing into the detection layer.

Patent Literature 2 discloses a diffusion barrier including a single block copolymer having at least one hydrophilic block and at least one hydrophobic block. Similarly to Patent Literature 1, this diffusion barrier controls diffusion of an analyte from an exterior of an electrode system to enzyme molecules. In addition, such enzyme molecules are immobilized on an electrode to form an enzyme layer. In a production of such an enzyme layer, for example, as disclosed in Patent Literature 3, enzyme molecules can be more firmly immobilized by immobilizing an enzyme on a working electrode by adsorption or capture, and then performing crosslinking with glutaraldehyde or the like.

CITATION LIST

Patent Literature

Patent Literature 1: JP 2010-517054 A
Patent Literature 2: JP 2015-515305 A
Patent Literature 3: WO 2007/147475 A

SUMMARY OF THE INVENTION

Technical Problem to be Solved by the Invention

In an embedded-type sensor, a probe of the sensor is inserted in a body for a long time, and therefore the case is increased where an analyte-responsive enzyme or a redox mediator, which is a constituent element of the sensor, flows out. When the analyte-responsive enzyme or the redox mediator flows out to the outside of the sensor, not only sensitivity of the sensor is deteriorated, but also flowing out causes damage to the living body. Furthermore, when the analyte-responsive enzyme or the redox mediator flows out to the outside, durability of the sensor is lowered. It is therefore very important to take measures to prevent flowing out of the analyte-responsive enzyme or the redox mediator.

When both the analyte-responsive enzyme and the redox mediator constituting the probe of an embedded-type biosensor are immobilized in order to prevent flowing out, a combination of the enzyme and the mediator polymer that can be used, or a structure of the sensor is restricted. Therefore, development of a film that is formed on a detection layer including the enzyme and/or the redox mediator and that can prevent the enzyme and the redox mediator from flowing out to the outside is desired. Moreover, such a film must not inhibit an analyte such as glucose from entering inside. Therefore, an object of the present disclosure is to provide a protection film that does not inhibit an analyte from entering inside and prevents an enzyme and a redox mediator from flowing out to the outside in order to be applied to a probe of an embedded-type biosensor.

Means for Solving the Problem

The present disclosure provides, as a film structure useful for a probe of a biosensor, a film structure including:

a detection layer including at least an analyte-responsive enzyme and a redox mediator; and a protection film formed on the detection layer, in which the protection film includes a copolymer mixture including:

poly(4-vinylpyridine)-block-poly($C_{1-15}$ alkyl methacrylate) represented by Formula (1):

[Chemical Formula 1]

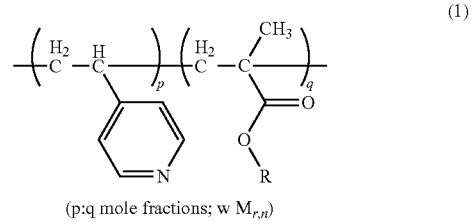

(p:q mole fractions; w $M_{r,n}$)

where R represents an alkyl group having 1 to 15 carbon atoms; p and q each represent repeating units of two types of monomer units of 4-vinylpyridine and $C_{1-15}$ alkyl methacrylate; and w represents a number average molecular weight, or poly(4-vinylpyridine)-block-poly($C_{1-15}$ alkyl methacrylate) represented by Formula (1); and poly(4-vinylpyridine-ran-2-hydroxyethyl methacrylate) represented by Formula (2):

[Chemical Formula 2]

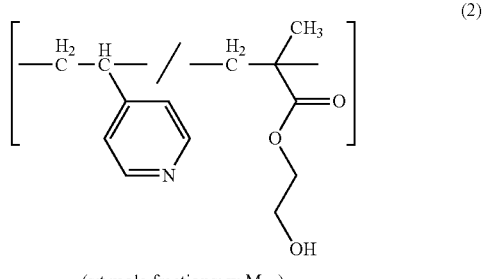

(s:t mole fractions; w $M_{r,n}$)

where s and t each represent mole fractions of two types of monomer units of 4-vinylpyridine and 2-hydroxyethyl methacrylate, and satisfy the relationship s+t=100; and w represents a number average molecular weight. Note that, the oblique lines between monomers in the formula indicate that the three types of monomer units are not bonded in the order described in the formula, but are randomly bonded to each other when excluding deviation caused by reactivity between monomer units.

The polymer represented by Formula (1) above is a block copolymer including poly(4-vinylpyridine) and poly($C_{1-15}$ alkyl methacrylate). A repeating unit p of 4-vinylpyridine constituting poly(4-vinylpyridine) and a repeating unit q of alkyl methacrylate constituting poly($C_{1-15}$ alkyl methacrylate) may each be set so that the number average molecular weight of each block constituting the polymer is 50 to $200 \times 10^3$, and preferably 60 to $100 \times 10^3$.

In the polymer represented by Formula (1) above, $C_{1-15}$ alkyl of poly($C_{1-15}$ alkyl methacrylate) represents an alkyl group having 1 to 15 carbon atoms. Examples thereof include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, and isomers thereof, and a $C_{3-6}$ alkyl group is preferred.

The polymer represented by Formula (2) above is advantageous for enhancing biocompatibility, and is a random copolymer including 4-vinylpyridine and 2-hydroxyethyl methacrylate as a monomer unit. The mole fraction s of 4-vinylpyridine is 40 to 80, and preferably 60 to 70. The mole fraction t of 2-hydroxyethyl methacrylate is 20 to 60, and preferably 30 to 40. Further, s and t need not to be an integer as long as the sum of s and t is 100. Furthermore, the number average molecular weight of the polymer is 20 to $500\times10^3$, and preferably 60 to $300\times10^3$.

The above-described polymer may be crosslinked with a crosslinking agent such as polyethylene glycol diglycidyl ether (PEGDGE).

The protection film may further contain, for example, poly(2-methoxyethylacrylate) as an additive. This enhances biocompatibility of the protection film.

Effects of the Invention

When a protection film including the polymer for a protection film of the present disclosure is formed on a detection layer including an enzyme and a mediator constituting a probe of an embedded-type biosensor, it is possible to avoid inhibiting an analyte such as glucose from entering inside and to prevent the enzyme or the mediator included in the detection layer from flowing out to the outside.

BRIEF DESCRIPTION OF DRAWINGS

FIG. 1 is a schematic view illustrating a state where an embedded-type biosensor is attached to a living body (human body).

FIG. 2 is a cross-sectional view illustrating an embedded-type biosensor in a state of being attached to a living body (human body).

FIG. 3 is a schematic view of an embedded-type biosensor that performs wireless communication of measurement data with a smartphone.

FIGS. 4a and 4b show a production step of a probe of an embedded-type biosensor as a specific example of the present disclosure.

FIGS. 5c to 5e show a production step of a probe of an embedded-type biosensor as a specific example of the present disclosure.

FIGS. 6f and 6g show a production step of a probe of an embedded-type biosensor as a specific example of the present disclosure.

FIG. 7 is a top view on a front side of a probe of an embedded-type biosensor as a specific example of the present disclosure.

FIG. 8 is a cross-sectional view taken along the line A-A' of FIG. 7.

FIG. 9 is a cross-sectional view taken along the line B-B' of FIG. 8.

FIG. 10 is a cross-sectional view taken along the line C-C' of FIG. 8.

FIG. 11 shows graphs showing glucose response characteristics of probes in which the copolymers or copolymer mixtures of the present disclosure are used for a protection film.

FIG. 12 shows graphs showing durability of probes in which the copolymer or copolymer mixtures of the present disclosure are used for a protection film.

FIG. 13 shows graphs showing glucose response characteristics of probes in which the polymers of Comparative Examples and the conventional polymers are used for a protection film.

FIG. 14 shows graphs showing durability of probes in which the polymers of Comparative Examples and the conventional polymers are used for a protection film.

FIG. 15 shows graphs showing glucose response characteristics of probes in which the polymers of Reference Examples and the conventional polymers are used for a protection film.

FIG. 16 shows graphs showing durability of probes in which the polymers of Reference Examples and the conventional polymers are used for a protection film.

MODES FOR CARRYING OUT THE INVENTION

1. Production Method of Probe of Embedded-Type Biosensor

A production method of a probe 11 of an embedded-type biosensor 1, to which the film structure of the present disclosure is applied, will be described as a specific example. The structure and production method described below are one of specific examples of the present disclosure, and are not limited to the features described below as long as it can be used as a probe.

(1) Preparation of Insulating Substrate

The embedded-type biosensor 1 includes a main body 10 and a probe 11. The probe 11, having a key shape, generally includes a sensing part to be inserted in a living body, and a terminal part to be electrically connected with an internal circuit of the biosensor main body 10. The sensing part is formed thin so as to be inserted in the body, and the terminal part has a certain size so as to be inserted in the biosensor main body 10 and establish electrical connection. Therefore, an insulating substrate 111 having a key shape is prepared firstly (FIG. 4a). In the upper part, a top view from the front side is shown, while in the lower part, a top view from the back side is shown (the same applies hereafter). This insulating substrate 111 is not particularly limited as long as it is made from a material and has a thickness that can be used as a probe to be inserted in the living body. For example, polyethylene terephthalate (PET) with a thickness of approximately 200 μm can be used.

(2) Formation of Conductive Thin Film

A conductive thin film 112 is formed by depositing carbon or a conductive metal material selected from the group consisting of metals such as gold, silver, platinum, and palladium on both sides of an insulating substrate 111 by sputtering, deposition, ion plating, or the like (FIG. 4b). The thickness of the conductive thin film is preferably 10 nm to several hundred nm.

(3) Formation of Electrode Lead

A groove 113 is formed with a depth that reaches the surface of the insulating substrate 111 by performing laser drawing on the conductive thin film 112 formed on the front side of the insulating substrate 111. The groove 113 separates a working electrode lead 112a and a reference electrode lead 112b and thus electrically insulates them from each other (FIG. 5c).

(4) Formation of Insulating Resist Film

On the front side of the insulating substrate 111, an insulating resist film 116a having an opening is formed in a part excluding regions used for a working electrode 114 and a reference electrode 115 as well as a working electrode terminal 114a and a reference electrode terminal 115a to be electrically connected with the main body 10, by sputtering, screen printing, or the like. On the back side of the insulating substrate 111, an insulating resist film 116b having an opening is formed in a part excluding regions used for a counter electrode 117 and a counter electrode terminal 117a to be electrically connected with the main body 10, by sputtering, screen printing, or the like (FIG. 5d). The thickness of the insulating resist film is preferably 5 to 40 μm.

(5) Formation of Reference Electrode

The reference electrode 115 is formed by depositing Ag/AgCl in the opening for the reference electrode of the resist film 116a formed on the front side of the insulating substrate 111 by screen printing or an inkjet method (FIG. 5e). The thickness of the reference electrode is preferably 5 to 40 μm.

(6) Formation of Detection Layer

A detection layer 118 including conductive particles, an analyte-responsive enzyme, and a redox mediator is formed by applying a suspension of conductive particles such as carbon particles, an aqueous solution of the analyte-responsive enzyme, and an aqueous solution of the redox mediator on the working electrode 114 and dried them (FIG. 6f). In the present disclosure, the "analyte-responsive enzyme" refers to a biochemical substance that can specifically catalyze oxidization or reduction of an analyte. Any biochemical substance can be employed if it can be used for the purpose of detection in a biosensor. For example, in a case where glucose is used as an analyte, an appropriate analyte-responsive enzyme is glucose oxidase (GOx), glucose dehydrogenase (GDH), or the like. The "redox mediator" refers to a redox substance that mediates electron transfer, and plays a role in transferring electrons generated via redox reaction of the analyte in a biosensor. For example, examples of the redox mediator include, but are not limited to, a phenazine derivative, and any redox substance may be used as long as it can be used for the purpose of detection in a biosensor. The thickness of the detection layer is preferably 5 to 80 μm.

(7) Formation of Protection Film

A protection film 119 is formed on the both surfaces, side surfaces, and tip of the sensing part by immersing the sensing part in a solution including a polymer for a protection film (FIG. 6g). The protection film 119 does not cover the working electrode terminal 114a, the reference electrode terminal 115a, and the counter electrode terminal 117a, but covers at least the working electrode 114, the reference electrode 115, the counter electrode 117, and the detection layer 118. The protection film 119 is formed with a length equal to or longer than the length inserted in the living body. The thickness of the protection film is preferably 5 to 200 μm.

2. Internal Structure of Probe of Embedded-Type Biosensor

The internal structure of the probe of an embedded-type biosensor, to which the film structure of the present disclosure is applied, will be further described.

FIG. 8 is a cross-sectional view taken along the line A-A' of FIG. 7. The conductive thin film 112 is formed on the both sides of the insulating substrate 111. In the conductive thin film 112 on the front side of the insulating substrate 111, two leads of the working electrode lead 112a and the reference electrode lead 112b are separated and electrically insulated by the groove 113. A part of the working electrode lead 112a functions as the working electrode 114, and the detection layer 118 is formed on the working electrode 114. The reference electrode 115 is formed in the opening part of the insulating resist film 116a, and is electrically connected with the reference electrode lead 112b. The conductive thin film 112 on the back side of the insulating substrate 111 is a counter electrode lead 112c, and a part of the counter electrode lead 112c functions as the counter electrode 117.

FIG. 9 is a cross-sectional view taken along the line B-B' of FIG. 8. The working electrode 114 is formed on the front side of the insulating substrate 111, and the detection layer 118 is formed on the working electrode 114. The counter electrode 117 is formed on the back side of the insulating substrate 111. Furthermore, FIG. 9 shows that the entire periphery of the sensing part is covered by the protection film 119 of the present disclosure.

FIG. 10 is a cross-sectional view taken along the line C-C' of FIG. 8. The working electrode lead 112a and the reference electrode lead 112b, which are electrically separated by the groove 113, are formed on the front side of the insulating substrate 111. The insulating resist film 116a is formed on the working electrode lead 112a and the reference electrode lead 112b. The reference electrode 115 is formed in the opening part of the insulating resist film 116a. The counter electrode lead 112c is formed on the back side of the insulating substrate 111, and the insulating resist film 116b is formed on the counter electrode lead 112c. Furthermore, FIG. 9 shows that the entire periphery of the sensing part is covered by the protection film 119 of the present disclosure.

EXAMPLES

Example 1

<Production of Probe>

(1) Preparation of Insulating Substrate

As shown in FIG. 4a, polyethylene terephthalate (PET), (Lumirror R E20, #188, available from Toray Industries, Inc., 189 μm thick) was cut to prepare an insulating substrate having a key shape.

(2) Formation of Conductive Thin Film

As shown in FIG. 4b, a conductive thin film (thickness: 30 nm) was formed by depositing gold on both sides of the insulating substrate by sputtering.

(3) Formation of Electrode Lead

As shown in FIG. 5c, a groove was formed with a depth that reaches the surface of the insulating substrate by performing laser drawing on the conductive thin film formed on the front side of the insulating substrate, thus separating and electrically insulating a working electrode lead and a reference electrode lead.

(4) Formation of Insulating Resist Film

As shown in FIG. 5d, on the front side of the insulating substrate, an insulating resist film having an opening was formed in a part excluding regions used for the working electrode and the reference electrode as well as a working electrode terminal and a reference electrode terminal to be electrically connected with a main body of an embedded-type biosensor by screen printing. On the back side of the insulating substrate, an insulating resist film (thickness: 10 to 15 μm) having an opening was formed in a part excluding regions used for a counter electrode and a counter electrode terminal to be electrically connected with the main body by screen printing.

(5) Formation of Reference Electrode

As shown in FIG. 5e, a reference electrode (thickness: 10 to 15 μm) was formed by depositing Ag/AgCl in the opening for the reference electrode of the resist film formed on the front side of the insulating substrate by screen printing.

(6) Formation of Detection Layer

As shown in FIG. 6f, a conductive thin film that is exposed from the opening part of the insulating resist film formed on the front side of the insulating substrate was determined to be a working electrode, and a detection layer (thickness: 15 μm) was formed by applying, on the working electrode, appropriate amounts of a suspension of carbon particles as conductive particles, an aqueous solution of glucose oxidase (GOx) as an analyte-responsive enzyme for glucose, and an aqueous solution of a phenazine derivative as a redox mediator and drying them.

(7) Formation of Protection Film

As shown in FIG. 6g, a protection film (thickness: 5 to 40 μm) was formed on the both surfaces, side surfaces, and tip of the sensing part by immersing the sensing part in an ethanol solution containing a crosslinking agent and a polymer for a protection film.

More specifically, the probe produced as described above was immersed 6 times at 10 minutes intervals in a solution in which 600 mg of poly(4-vinylpyridine)-block-poly(1,1-dimethylethyl methacrylate) ($M_w/M_n$=1.15; w'=77.0-g-80.0×10$^3$) [block copolymer (3)] represented by Formula (3):

[Chemical Formula 3]

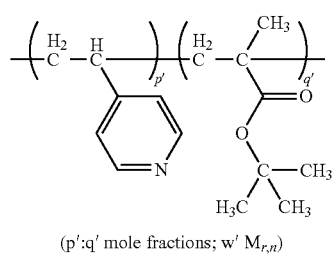

(p':q' mole fractions; w' $M_{r,n}$)

and 47 mg of polyethylene glycol diglycidyl ether (PEGDGE) (Mn=1000) as a crosslinking agent were dissolved in 1 mL of a solvent (ethanol 95%, 4-(2-hydroxyethyl)-1-piperazine ethanesulfonic acid (HEPES) buffer solution (10 mM, pH 8) 5%). Thereafter, the probe was dried over 48 hours at room temperature to form a crosslinked protection film, and thereby a probe A was obtained. The formation conditions of the above-described protection film were summarized in Table 1.

<Measurement of Probe Characteristics>

[Glucose Response Characteristics]

The probe A was attached to an embedded-type amperometric glucose sensor, and then the probe was placed in a phosphate-buffered saline solution (PBS, pH 7) at 37° C. To the PBS solution, 50, 100, 200, 300, 400, and 500 mg/dL of glucose was added every 500 seconds in the order of amounts described, and the current response value (nA) was continuously measured.

High linearity was shown at a glucose concentration of 0 to 500 mg/dL, and glucose response was favorable. The result is shown in FIG. 11 and summarized in Table 2.

[Durability]

The probe A was stored in a phosphate-buffered saline solution (PBS, pH 7) at 37° C. The probe A was attached to an embedded-type amperometric glucose sensor before storage (day 0) and 7 days after storage, and the probe was placed in a phosphate-buffered saline solution (PBS, pH 7) at 37° C. To the PBS solution, 50, 100, 200, 300, 400, and 500 mg/dL of glucose was added every 500 seconds in the order of amounts described, and the current response value (nA) was continuously measured. The response ratio (%) at each concentration was calculated as the current response value at a glucose concentration of 500 mg/dL on day 0 being 100%.

Response characteristics 7 days after storage showed high linearity at a glucose concentration of 0 to 500 mg/dL and showed almost no change compared to day 0, and durability was favorable. The result is shown in FIG. 12 and summarized in Table 2.

Example 2

<Production of Probe>

In the formation of the protection film, a probe was produced in the same manner as in Example 1, except for changing polymers for a protection film and increasing the number of immersions in the crosslinking agent solution.

More specifically, a protection film was formed in the same manner as in Example 1, except for immersing the probe produced as described above 9 times at 10 minutes intervals in a solution including 300 mg of poly(4-vinylpyridine)-block-poly(1,1-dimethylethyl methacrylate) ($M_w/M_n$=1.15; w'=77.0-g-80.0×10$^3$) [block copolymer (3)] represented by Formula (3) and 300 mg of poly(4-vinylpyridine)-block-poly(n-butyl methacrylate) ($M_w/M_n$=1.3; w''=6.0-g-4.5×10$^3$) [block copolymer (4)] represented by Formula (4):

[Chemical Formula 4]

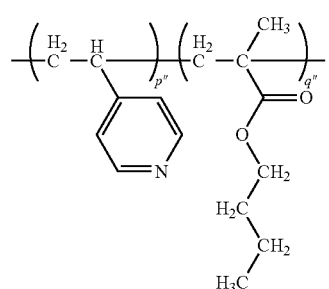

(p'':q'' mole fractions; w'' $M_{r,n}$)

in place of 600 mg of poly(4-vinylpyridine)-block-poly(1,1-dimethylethyl methacrylate) ($M_w/M_n$=1.15; w'=77.0-g-80.0×10$^3$) [block copolymer (3)] represented by Formula (3) in Example 1, and thus a probe B was obtained. The formation conditions of the above-described protection film were summarized in Table 1.

<Measurement of Probe Characteristics>

[Glucose Response Characteristics]

The glucose response characteristics of the probe B was measured in the same manner as in Example 1.

High linearity was shown at a glucose concentration of 0 to 500 mg/dL, and glucose response was favorable. The result is shown in FIG. 11 and summarized in Table 2.

[Durability]

The durability of the probe B was measured in the same manner as in Example 1.

Response characteristics 7 days after storage maintained linearity at a glucose concentration of 0 to 500 mg/dL, and durability was favorable. The result is shown in FIG. 12 and summarized in Table 2.

Example 3

In the formation of the protection film, a probe was produced in the same manner as in Example 1, except for changing polymers for a protection film and increasing the number of immersions in the crosslinking agent solution.

More specifically, a protection film was formed in the same manner as in Example 1, except for immersing the probe produced as described above 9 times at 10 minutes intervals in a solution including 300 mg of poly(4-vinylpyridine)-block-poly(1,1-dimethylethyl methacrylate) ($M_w/M_n$=1.15; w'=77.0-g-80.0×10³) [block copolymer (3)] represented by Formula (3) and 300 mg of poly(4-vinylpyridine-ran-2-hydroxyethyl methacrylate) ($M_w/M_n$=1.2) [random copolymer (5)] represented by Formula (5):

[Chemical Formula 5]

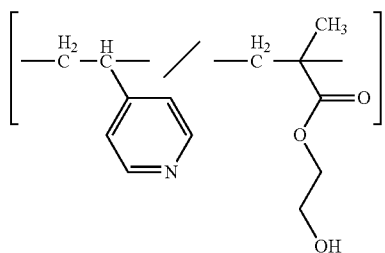

(5)

(65:35 mole fractions; 85 × 10³ $M_{r,n}$)

in place of 600 mg of poly(4-vinylpyridine)-block-poly(1,1-dimethylethyl methacrylate) ($M_w/M_n$=1.15; w'=77.0-g-80.0×10³) [block copolymer (3)] represented by Formula (3) in Example 1, and thus a probe C was obtained. Formation conditions of the above-described protection film were summarized in Table 1.

<Measurement of Probe Characteristics>

[Glucose Response Characteristics]

The glucose response characteristics of the probe C was measured in the same manner as in Example 1.

High linearity was shown at a glucose concentration of 0 to 500 mg/dL, and glucose response was favorable. The result is shown in FIG. 11 and summarized in Table 2.

[Durability]

The durability of the probe C was measured in the same manner as in Example 1.

Response characteristics 7 days after storage maintained linearity at a glucose concentration of 0 to 500 mg/dL, and durability was favorable. The result is shown in FIG. 12 and summarized in Table 2.

Example 4

In the formation of the protection film, a probe was produced in the same manner as in Example 1, except for changing polymers for a protection film and increasing the number of immersions in the crosslinking agent solution.

More specifically, a protection film was formed in the same manner as in Example 1, except for immersing the probe produced as described above 9 times at 10 minutes intervals in a solution including 300 mg of poly(4-vinylpyridine)-block-poly(1,1-dimethylethyl methacrylate) ($M_w/M_n$=1.15; w'=77.0-g-80.0×10³) [block copolymer (3)] represented by Formula (3) and 300 mg of poly(4-vinylpyridine-ran-2-hydroxyethyl methacrylate) ($M_w/M_n$=1.6) [random copolymer (6)] represented by Formula (6):

[Chemical Formula 6]

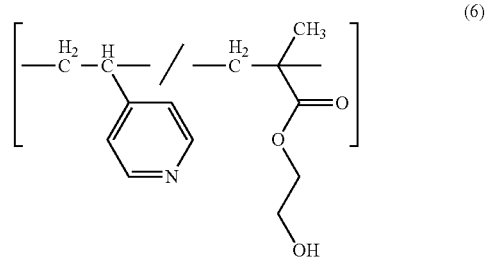

(6)

(65:35 mole fractions; 243×10³ $M_{r,n}$)

in place of 600 mg of poly(4-vinylpyridine)-block-poly(1,1-dimethylethyl methacrylate) ($M_w/M_n$=1.15; w'=77.0-g-80.0×10³) [block copolymer (3)] represented by Formula (3) in Example 1, and thus a probe D was obtained. The formation conditions of the above-described protection film were summarized in Table 1.

<Measurement of Probe Characteristics>

[Glucose Response Characteristics]

The glucose response characteristics of the probe D was measured in the same manner as in Example 1.

High linearity was shown at a glucose concentration of 0 to 500 mg/dL, and glucose response was favorable. The result is shown in FIG. 11 and summarized in Table 2.

[Durability]

The durability of the probe D was measured in the same manner as in Example 1.

Response characteristics 7 days after storage maintained linearity at a glucose concentration of 0 to 500 mg/dL and showed almost no change compared to day 0, and durability was favorable. The result is shown in FIG. 12 and summarized in Table 2.

Comparative Example 1

In the formation of the protection film, a probe was produced in the same manner as in Example 1, except for changing polymers for a protection film and increasing the number of immersions in the crosslinking agent solution.

More specifically, the probe produced as described above was immersed 9 times at 10 minutes intervals in a solution in which 300 mg of poly(4-vinylpyridine)-block-poly(1,1-dimethylethyl methacrylate) ($M_w/M_n$=1.15; w'=77.0-g-80.0×10³) [block copolymer (3)] represented by Formula (3), 300 mg of poly(4-vinylpyridine) ($M_w$=160,000) [P4VP], and 47 mg of polyethylene glycol diglycidyl ether (PEGDGE) (Mn=1000) as a crosslinking agent were dissolved in 1 mL of a solvent (ethanol 95%, 4-(2-hydroxyethyl)-1-piperazine ethanesulfonic acid (HEPES) buffer solution (10 mM, pH 8) 5%). Thereafter, the probe was dried over 48 hours at room temperature to form a crosslinked protection film, and thereby a probe E was obtained. The formation conditions of the above-described protection film were summarized in Table 3.

<Measurement of Probe Characteristics>

[Glucose Response Characteristics]

The glucose response characteristics of the probe E was measured in the same manner as in Example 1.

High linearity was shown at a glucose concentration of 0 to 500 mg/dL, and glucose response was favorable. The result is shown in FIG. 13 and summarized in Table 4.

[Durability]

The durability of the probe E was measured in the same manner as in Example 1.

Response characteristics 7 days after storage decreased to 48% at a glucose concentration of 500 mg/dL, and durability was poor. The result is shown in FIG. 14 and summarized in Table 4.

Comparative Example 2

In the formation of the protection film, a probe was produced in the same manner as in Example 1, except for changing polymers for a protection film, increasing the amount of the crosslinking agent, and increasing the number of immersions in the crosslinking agent solution.

More specifically, the probe produced as described above was immersed 9 times at 10 minutes intervals in a solution in which 800 mg of poly(4-vinylpyridine) (M 160,000) [P4VP] and 62 mg of polyethylene glycol diglycidyl ether (PEGDGE) (Mn=1000) as a crosslinking agent were dissolved in 1 mL of a solvent (ethanol 95%, 4-(2-hydroxyethyl)-1-piperazine ethanesulfonic acid (HEPES) buffer solution (10 mM, pH 8) 5%). Thereafter, the probe was dried over 48 hours at room temperature to form a crosslinked protection film, and thereby a probe F was obtained. The formation conditions of the above-described protection film were summarized in Table 3.

<Measurement of Probe Characteristics>

[Glucose Response Characteristics]

The glucose response characteristics of the probe F was measured in the same manner as in Example 1.

High linearity was shown at a glucose concentration of 0 to 500 mg/dL, and glucose response was favorable. The result is shown in FIG. 13 and summarized in Table 4.

[Durability]

The durability of the probe F was measured in the same manner as in Example 1.

Response characteristics 7 days after storage decreased to 22% at a glucose concentration of greater than 100 mg/dL, and durability was poor. The result is shown in FIG. 14 and summarized in Table 4.

Reference Example 1

In the formation of the protection film, a probe was produced in the same manner as in Example 1, except for changing polymers for a protection film, increasing the amount of the crosslinking agent, and increasing the number of immersions in the crosslinking agent solution.

More specifically, the probe produced as described above was immersed 12 times at 10 minutes intervals in a solution in which 800 mg of poly(4-vinylpyridine)-block-poly(n-butyl methacrylate) ($M_w/M_n$=1.3; w''=6.0-g-4.5×10$^3$) [block copolymer (4)] represented by Formula (4) and 62 mg of polyethylene glycol diglycidyl ether (PEGDGE) (Mn=1000) as a crosslinking agent were dissolved in 1 mL of a solvent (ethanol 95%, 4-(2-hydroxyethyl)-1-piperazine ethanesulfonic acid (HEPES) buffer solution (10 mM, pH 8) 5%). Thereafter, the probe was dried over 48 hours at room temperature to form a crosslinked protection film, and thereby a probe G was obtained. The formation conditions of the above-described protection film were summarized in Table 5.

<Measurement of Probe Characteristics>

[Glucose Response Characteristics]

The glucose response characteristics of the probe G was measured in the same manner as in Example 1.

High linearity was shown at a glucose concentration of 0 to 500 mg/dL, and glucose response was favorable. The result is shown in FIG. 15 and summarized in Table 6.

[Durability]

The durability of the probe G was measured in the same manner as in Example 1.

Response characteristics 7 days after storage decreased to 46% at a glucose concentration of greater than 200 mg/dL, and durability was poor. The result is shown in FIG. 16 and summarized in Table 6.

Reference Example 2

In the formation of the protection film, a probe was produced in the same manner as in Example 1, except for changing polymers for a protection film, increasing the amount of the crosslinking agent, and increasing the number of immersions in the crosslinking agent solution.

More specifically, the probe produced as described above was immersed 8 times at 10 minutes intervals in a solution in which 800 mg of poly(4-vinylpyridine-ran-2-hydroxyethyl methacrylate) [random copolymer (5)] represented by Formula (5) and 62 mg of polyethylene glycol diglycidyl ether (PEGDGE) (Mn=1000) as a crosslinking agent were dissolved in 1 mL of a solvent (ethanol 95%, 4-(2-hydroxyethyl)-1-piperazine ethanesulfonic acid (HEPES) buffer solution (10 mM, pH 8) 5%). Thereafter, the probe was dried over 48 hours at room temperature to form a crosslinked protection film, and thereby a probe H was obtained. The formation conditions of the above-described protection film were summarized in Table 5.

<Measurement of Probe Characteristics>

[Glucose Response Characteristics]

The glucose response characteristics of the probe H was measured in the same manner as in Example 1.

High linearity was shown at a glucose concentration of 0 to 500 mg/dL, and glucose response was favorable. The result is shown in FIG. 15 and summarized in Table 6.

[Durability]

The durability of the probe H was measured in the same manner as in Example 1.

Response characteristics 7 days after storage decreased to 25% at a glucose concentration of greater than 200 mg/dL, and durability was poor. The result is shown in FIG. 16 and summarized in Table 6.

Reference Example 3

In the formation of the protection film, a probe was produced in the same manner as in Example 1, except for changing polymers for a protection film, increasing the amount of the crosslinking agent, and increasing the number of immersions in the crosslinking agent solution.

More specifically, the probe produced as described above was immersed 8 times at 10 minutes intervals in a solution in which 800 mg of poly(4-vinylpyridine-ran-2-hydroxyethyl methacrylate) [random copolymer (6)] represented by Formula (6) and 62 mg of polyethylene glycol diglycidyl ether (PEGDGE) (Mn=1000) as a crosslinking agent were dissolved in 1 mL of a solvent (ethanol 95%, 4-(2-hydroxyethyl)-1-piperazine ethanesulfonic acid (HEPES) buffer solution (10 mM, pH 8) 5%). Thereafter, the probe was dried over 48 hours at room temperature to form a crosslinked protection film, and thereby a probe I was obtained. The formation conditions of the above-described protection film were summarized in Table 5.

<Measurement of Probe Characteristics>

[Glucose Response Characteristics]

The glucose response characteristics of the probe I was measured in the same manner as in Example 1.

High linearity was shown at a glucose concentration of 0 to 500 mg/dL, and glucose response was favorable. The result is shown in FIG. 15 and summarized in Table 6.

[Durability]

The durability of the probe I was measured in the same manner as in Example 1.

Response characteristics 7 days after storage decreased to 32% at a glucose concentration of greater than 200 mg/dL, and durability was poor. The result is shown in FIG. 16 and summarized in Table 6.

Reference Example 4

In the formation of the protection film, a probe was produced in the same manner as in Example 1, except for changing polymers for a protection film, increasing the amount of the crosslinking agent, and increasing the number of immersions in the crosslinking agent solution.

More specifically, the probe produced as described above was immersed 8 times at 10 minutes intervals in a solution in which 400 mg of poly(4-vinylpyridine-ran-2-hydroxyethyl methacrylate) [random copolymer (5)] represented by Formula (5), 400 mg of poly(4-vinylpyridine-ran-2-hydroxyethyl methacrylate) [random copolymer (6)] represented by Formula (6), and 62 mg of polyethylene glycol diglycidyl ether (PEGDGE) (Mn=1000) as a crosslinking agent were dissolved in 1 mL of a solvent (ethanol 95%, 4-(2-hydroxyethyl)-1-piperazine ethanesulfonic acid (HEPES) buffer solution (10 mM, pH 8) 5%). Thereafter, the probe was dried over 48 hours at room temperature to form a crosslinked protection film, and thereby a probe J was obtained. The formation conditions of the above-described protection film were summarized in Table 5.

<Measurement of Probe Characteristics>

[Glucose Response Characteristics]

The glucose response characteristics of the probe J was measured in the same manner as in Example 1.

High linearity was shown at a glucose concentration of 0 to 500 mg/dL, and glucose response was favorable. The result is shown in FIG. 15 and summarized in Table 6.

[Durability]

The durability of the probe J was measured in the same manner as in Example 1.

Response characteristics 7 days after storage decreased to 30% at a glucose concentration of greater than 200 mg/dL, and durability was poor. The result is shown in FIG. 16 and summarized in Table 6.

TABLE 1

|  | Probe A (w/v) | Probe B (w/v) | Probe C (w/v) | Probe D (w/v) |
|---|---|---|---|---|
| Copolymer (3) | 6% | 3% | 3% | 3% |
| Copolymer (4) |  | 3% |  |  |
| Copolymer (5) |  |  | 3% |  |
| Copolymer (6) |  |  |  | 3% |
| P4VP |  |  |  |  |
| PEGDGE | 0.47% | 0.47% | 0.47% | 0.47% |
| No. of Dips | 6 | 9 | 9 | 9 |

TABLE 2

| Glucose Addition (mg/dL) | Probe A Day 0 | Probe A Day 7 | Probe B Day 0 | Probe B Day 7 | Probe C Day 0 | Probe C Day 7 | Probe D Day 0 | Probe D Day 7 |
|---|---|---|---|---|---|---|---|---|
| 0 | 0 | 0 | 0 | 0 | 0 | 0 | 0 | 0 |
| 50 | 8 | 9 | 12 | 9 | 13 | 10 | 10 | 10 |
| 100 | 18 | 17 | 26 | 17 | 25 | 18 | 24 | 19 |
| 200 | 37 | 34 | 41 | 30 | 47 | 32 | 45 | 33 |
| 300 | 58 | 50 | 63 | 42 | 64 | 43 | 63 | 43 |
| 400 | 78 | 67 | 81 | 51 | 82 | 51 | 81 | 50 |
| 500 | 100 | 82 | 100 | 68 | 100 | 57 | 100 | 54 |

TABLE 3

|  | Probe E (w/v) | Probe F (w/v) |
|---|---|---|
| Copolymer (3) | 3% |  |
| Copolymer (4) |  |  |
| Copolymer (5) |  |  |
| Copolymer (6) |  |  |
| P4VP | 3% | 8% |
| PEGDGE | 0.47% | 0.62% |
| No. of Dips | 9 | 9 |

TABLE 4

| Glucose Addition (mg/dL) | Probe E Day 0 | Probe E Day 0 | Probe F Day 0 | Probe F Day 7 |
|---|---|---|---|---|
| 0 | 0 | 0 | 0 | 0 |
| 50 | 13 | 9 | 10 | 8 |
| 100 | 24 | 17 | 18 | 14 |
| 200 | 45 | 30 | 38 | 21 |
| 300 | 62 | 39 | 57 | 23 |
| 400 | 80 | 45 | 78 | 23 |
| 500 | 100 | 48 | 100 | 22 |

TABLE 5

|  | Probe G (w/v) | Probe H (w/v) | Probe I (w/v) | Probe J (w/v) |
|---|---|---|---|---|
| Copolymer (3) |  |  |  |  |
| Copolymer (4) | 8% |  |  |  |
| Copolymer (5) |  | 8% |  | 4% |
| Copolymer (6) |  |  | 8% | 4% |
| P4VP |  |  |  |  |
| PEGDGE | 0.62% | 0.62% | 0.62% | 0.62% |
| No. of Dips | 12 | 8 | 8 | 8 |

TABLE 6

| Glucose Addition (mg/dL) | Probe G Day 0 | Probe G Day 7 | Probe H Day 0 | Probe H Day 7 | Probe I Day 0 | Probe I Day 7 | Probe J Day 0 | Probe J Day 7 |
|---|---|---|---|---|---|---|---|---|
| 0 | 0 | 0 | 0 | 0 | 0 | 0 | 0 | 0 |
| 50 | 12 | 12 | 11 | 7 | 14 | 11 | 10 | 10 |
| 100 | 22 | 22 | 21 | 13 | 26 | 18 | 19 | 18 |
| 200 | 43 | 37 | 39 | 22 | 46 | 28 | 37 | 28 |
| 300 | 62 | 45 | 55 | 24 | 62 | 32 | 54 | 31 |
| 400 | 81 | 46 | 74 | 24 | 78 | 33 | 73 | 31 |
| 500 | 100 | 46 | 100 | 25 | 100 | 32 | 100 | 30 |

It was confirmed that using a protection film including the polymer for a protection film of the present disclosure for a sensing part of a probe yielded favorable glucose response and enhanced durability compared to the conventional polymers.

INDUSTRIAL APPLICABILITY

The film structure of the present disclosure, including a detection layer including at least an analyte-responsive enzyme and a redox mediator, and a protection film formed on the detection layer, is useful for a probe of an embedded-type biosensor.

REFERENCE SIGNS LIST

1 Embedded-type biosensor
10 Main body
11 Probe
111 Insulating substrate
112 Conductive thin film
112a Working electrode lead
112b Reference electrode lead
112c Counter electrode lead
113 Groove
114 Working electrode
115 Reference electrode
116 Insulating resist
117 Counter electrode
118 Detection layer
119 Protection film
2 Living body
3 Information communication device

The invention claimed is:
1. A biosensor, comprising:
a working electrode;
a reference electrode; and
a counter electrode;
a detection layer formed on the working electrode; and
a protection film covering the working electrode,
wherein the detection layer includes an analyte-responsive enzyme and a redox mediator; and
wherein the protection film is prepared from a mixture comprises:
a copolymer: poly(4-vinylpyridine)-block-poly($C_{3-6}$ alkyl methacrylate) represented by Formula (1):

[Chemical Formula 1]

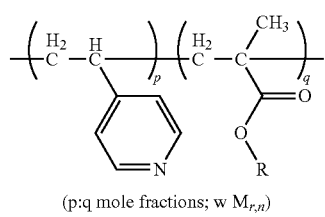

(p:q mole fractions; w $M_{r,n}$)

wherein
R represents an alkyl group having 3 to 6 carbon atoms;
p and q each represent repeating units of two types of monomer units of 4-vinylpyridine and $C_{3-6}$ alkyl methacrylate, respectively;
p and q and are not 0;
w represents a number average molecular weight; and
the repeating unit p of 4-vinylpyridine constituting poly(4-vinylpyridine) and the repeating unit q of alkyl methacrylate constituting poly($C_{3-6}$ alkyl methacrylate) are each set so that the number average molecular weight of each block constituting the polymer is 50 to 200×10³, and
a crosslinking agent.

2. The biosensor according to claim 1, wherein the protection film covers the working electrode, the reference electrode, the counter electrode, and the detection layer.

3. The biosensor according to claim 1, wherein the crosslinking agent is polyethylene glycol diglycidyl ether (PEGDGE), and the copolymer represented by Formula (1) is crosslinked with polyethylene glycol diglycidyl ether (PEGDGE).

4. The biosensor according to claim 2, wherein the mixture further comprises poly(2-methoxyethylacrylate).

5. The biosensor according to claim 1, wherein the mixture further comprises poly(2-methoxyethylacrylate).

6. The biosensor according to claim 3, wherein the mixture further comprises poly(2-methoxyethylacrylate).

7. The biosensor according to claim 1, wherein the mixture comprises
a copolymer: poly(4-vinylpyridine)-block-poly($C_{1-15}$ alkyl methacrylate) represented by Formula (1); and
poly(4-vinylpyridine-ran-2-hydroxyethyl methacrylate) represented by Formula (2):

[Chemical Formula 2]

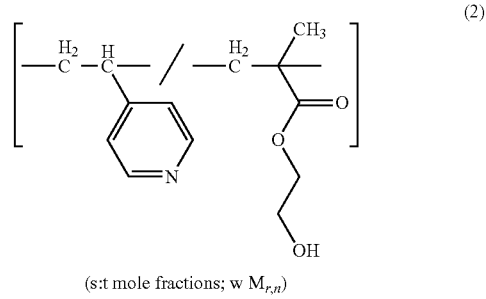

(s:t mole fractions; w $M_{r,n}$)

wherein s and t each represent mole fractions of two types of monomer units of 4-vinylpyridine and 2-hydroxyethyl methacrylate, respectively, and satisfy a relationship s+t=100 and s and t are not 0; and w represents a number average molecular weight.

8. The biosensor according to claim 1, wherein the copolymer represented by Formula (1) is
a copolymer: poly(4-vinylpyridine)-block-poly(ter-butyl methacrylate) represented by Formula (3):

[Chemical Formula 3]

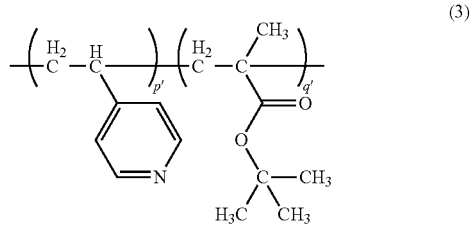

(p':q' mole fractions; w' $M_{r,n}$)

where p' and q' each represent repeating units of two types of monomer units of 4-vinylpyridine and ter-butyl methacrylate, respectively, and p' and q' are not 0; and w represents a number average molecular weight.

9. The biosensor according to claim 7, wherein the crosslinking agent is polyethylene glycol diglycidyl ether (PEGDGE), and the copolymer represented by Formula (1) and the copolymer represented by Formula (2) are crosslinked with polyethylene glycol diglycidyl ether (PEGDGE).

10. The biosensor according to claim 8, wherein the crosslinking agent is polyethylene glycol diglycidyl ether (PEGDGE), and the copolymer represented by Formula (3) is crosslinked with polyethylene glycol diglycidyl ether (PEGDGE).

11. The biosensor according to claim 1, wherein the polyethylene glycol diglycidyl ether (PEGDGE) is present in a 47:600 weight ratio relative to a total weight of the copolymer.

12. The biosensor according to claim 1, further comprising a working electrode terminal, a reference electrode terminal, and a counter electrode terminal.

13. The biosensor according to claim 12, wherein the protection film does not cover the working electrode terminal, the reference electrode terminal, and the counter electrode terminal.

14. The biosensor according to claim 1, wherein the detection layer has a thickness of 5 to 80 μm.

15. The biosensor according to claim 1, wherein the protection film has a thickness of 5 to 200 μm.

* * * * *